United States Patent

Xianglin

(10) Patent No.: US 10,048,386 B2
(45) Date of Patent: Aug. 14, 2018

(54) PRECISE GNSS POSITIONING SYSTEM WITH IMPROVED AMBIGUITY ESTIMATION

(71) Applicant: Fugro N.V., Leidschendam (NL)

(72) Inventor: Liu Xianglin, Leidschendam (NL)

(73) Assignee: FUGRO N.V. (NL)

( * ) Notice: Subject to any disclaimer, the term of this patent is extended or adjusted under 35 U.S.C. 154(b) by 264 days.

(21) Appl. No.: 14/854,786

(22) Filed: Sep. 15, 2015

(65) Prior Publication Data

US 2016/0077214 A1   Mar. 17, 2016

(30) Foreign Application Priority Data

Sep. 15, 2014   (NL) ...................... 2013473

(51) Int. Cl.
   *G01S 19/44*   (2010.01)
   *G01S 19/24*   (2010.01)
   *G01S 19/07*   (2010.01)

(52) U.S. Cl.
   CPC .............. *G01S 19/44* (2013.01); *G01S 19/24* (2013.01); *G01S 19/07* (2013.01)

(58) Field of Classification Search
   CPC .................................. G01S 19/44; G01S 19/24
   USPC .................................................. 342/357.27
   See application file for complete search history.

(56) References Cited

U.S. PATENT DOCUMENTS

| 6,268,824 | B1 | 7/2001 | Zhodzishky et al. | |
|---|---|---|---|---|
| 6,285,315 | B1 * | 9/2001 | Pratt | G01S 19/05 342/357.42 |
| 9,157,999 | B2 * | 10/2015 | Leandro | G01S 19/04 |
| 2005/0231423 | A1 | 10/2005 | Han et al. | |
| 2011/0090116 | A1 * | 4/2011 | Hatch | G01S 19/20 342/357.59 |
| 2011/0148698 | A1 | 6/2011 | Vollath | |
| 2012/0286991 | A1 * | 11/2012 | Chen | G01S 19/04 342/357.23 |
| 2015/0293233 | A1 * | 10/2015 | De Jong | G01S 19/04 342/357.27 |

FOREIGN PATENT DOCUMENTS

WO   2014065664 A1   5/2014

OTHER PUBLICATIONS

International Search Report for The Netherlands application No. 2013473; dated May 29, 2015.

* cited by examiner

*Primary Examiner* — Harry K Liu
(74) *Attorney, Agent, or Firm* — Polsinelli PC

(57) ABSTRACT

Method for precise GNSS positioning system with improved ambiguity estimation. The method is based on the realization that, especially during convergence, the estimated float ambiguities are biased when estimated simultaneously with the ionosphere parameters. The "ionosphere-like" biases can be separated from the actual float ambiguities by using the fixed wide-lane (or extra wide-lane) integer ambiguities. The original real-valued ambiguities (e.g., one of L1, L2 and L5 in the GPS case) are corrected using the corresponding biases, resulting in reliable float ambiguities that are taken as input in the next processing step.

20 Claims, 1 Drawing Sheet

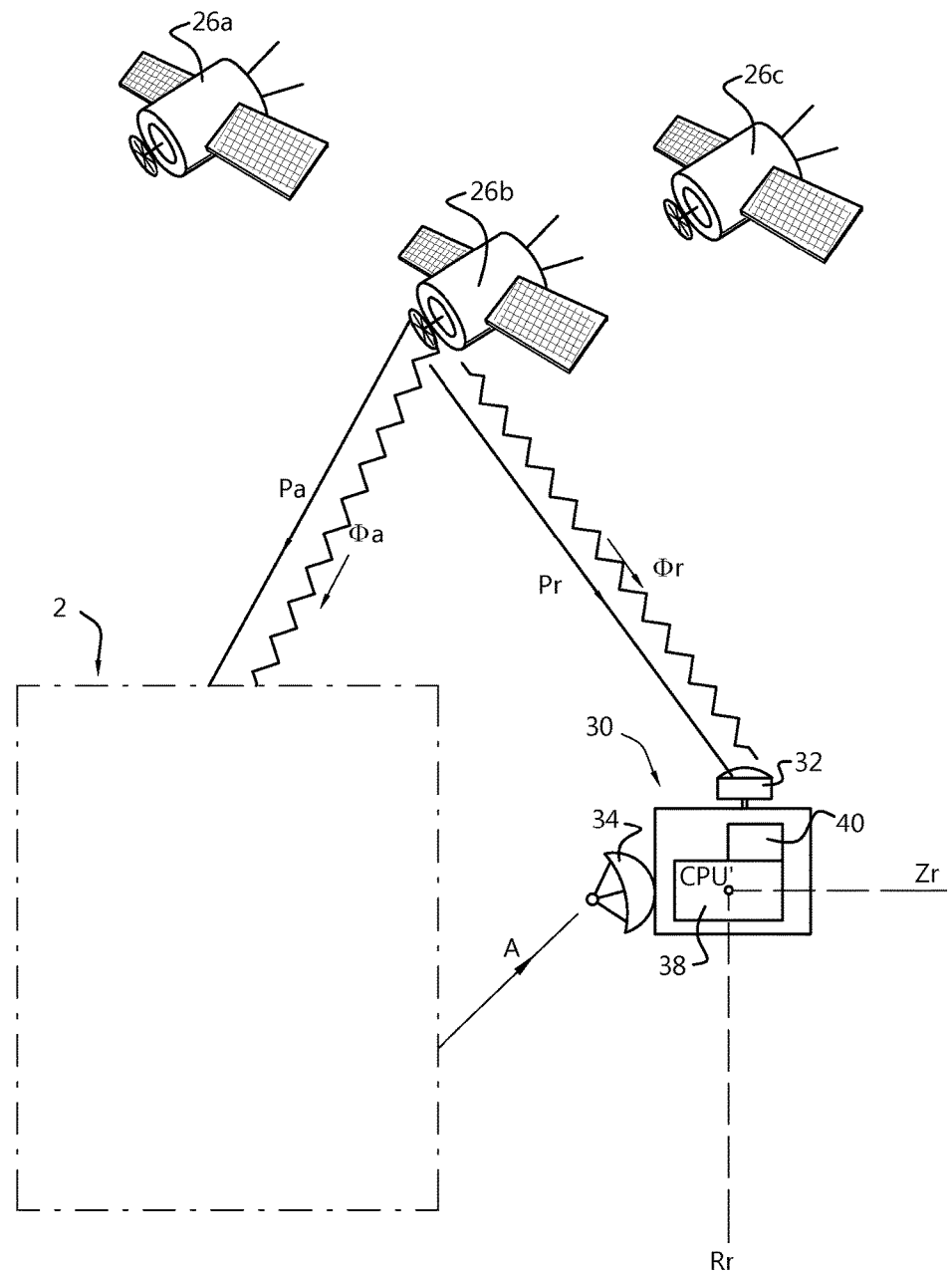

PRECISE GNSS POSITIONING SYSTEM WITH IMPROVED AMBIGUITY ESTIMATION

CROSS REFERENCE TO RELATED APPLICATIONS

This application claims priority from Dutch Patent Application No. 2013473, filed Sep. 15, 2014, the contents of which are entirely incorporated by reference herein.

TECHNICAL FIELD

The present invention relates to a method for estimating integer carrier ambiguities in a Global Navigation Satellite System (GNSS) based precise positioning system.

BACKGROUND

A Global Navigation Satellite System (GNSS) is a system of satellites that can be used for determining the geographic location of a mobile receiver with respect to the earth. GNSS include GPS, Glonass, Galileo and Beidou. Various Global Navigation Satellite (GNS) correction systems are known that are configured for receiving GNSS signal data from the GNSS satellites, for processing this GNSS data, for calculating GNSS corrections from the GNSS data, and for providing these corrections to a mobile, with the purpose of achieving quicker and more accurate calculation of the mobile's geographic position.

Various position estimation methods are known wherein the position calculations are based on repeated measurement of the so-called pseudo range and carrier phase observables by earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver. Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles that have elapsed before a lock-in to this signal alignment has been obtained, which number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

The following definitions are used herein to define additional concepts that are commonly known and used in the field of GNSS signal processing. The term "measurement" refers herein to a sampled numeric value resulting from actual measurement of an observable. The term "measurement equation" or "functional model" refers to the mathematical relations between the parameters (i.e. a collection of variable quantities that are assumed to be sufficient for unambiguously describing the behaviour of the system, but which are in general not directly measurable) and the measurements or observations (which are snapshots of measurable system parameters i.e. observables, but as such insufficient for predicting future system behaviour), as well as the expected evolution of the system state variables in time. The underlying position variables in the measurement equation are kinematically estimated based on new measurements.

SUMMARY OF INVENTION

The present invention seeks to provide a more efficient and robust method for estimating integer carrier ambiguities in a mobile side.

According to the present invention, a method according to the preamble defined above is provided, the method comprising iteratively solving a functional model for an observation vector obtained from a receiver r, the observation vector comprising observed minus computed code observations $\delta p_{i,r}^{s}$ and observed minus computed phase observations $\delta \phi_{i,r}^{s}$ of the receiver r to a plurality of GNSS satellites s for two or more carrier frequencies i, wherein integer carrier ambiguity terms of the functional model are estimated satellite pair by satellite pair.

According to the present invention embodiments, a method is based on the realization that, especially during convergence, the estimated float ambiguities are biased when estimated simultaneously with the ionosphere parameters. The "ionosphere-like" biases can be separated from the actual float ambiguities by using the fixed wide-lane (or extra wide-lane) integer ambiguities. The original real-valued ambiguities (e.g., one of L1, L2 and L5 carrier frequencies in the GPS case) are corrected using the corresponding biases, resulting in reliable float ambiguities that are taken as input in the next processing step.

This method may be implemented in both relative precise positioning and single precise point positioning. In the relative positioning case, it is assumed that the full observations or corrections from single/multiple reference stations are provided to the mobile. In the precise point positioning case, it is assumed that the precise orbit, clock and uncalibrated phase or hardware delay (UPD) are provided to the mobile. Optionally, the ionosphere and troposphere corrections may be provided as well.

BRIEF DESCRIPTION OF DRAWINGS

Embodiments will now be described, by way of example only, with reference to the accompanying schematic drawing in which corresponding reference symbols indicate corresponding parts.

The FIGURE shows a schematic diagram of an exemplary GNS signal correction system.

DESCRIPTION OF EMBODIMENTS

Several approaches to Precise Point Positioning Real-Time Kinematic (PPP RTK) and Precise Relative Positioning (PRP) exist, which methods can be employed for precise real-time GNSS positioning services. Integer ambiguity resolution (IAR) is a key technique for such services, and required for obtaining fast and accurate solutions. Herein below, embodiments of a PPP IAR and PRP method for improving precision and/or reducing convergence time of precise real-time GNSS positioning services are elucidated.

As illustrated in the schematic diagram of the FIGURE, the proposed approach can be used for both PRP and PPP mode. In both cases, a real-time service requires GNSS signals from the plurality of GNSS satellites 26*a-c* and an observation or correction system 2. In the PRP mode, the full observations from system 2 are relayed and applied to differentiate observations of a mobile or rover 30 to cancel out the common errors. Double difference ambiguities are formed. In the PPP mode, the PPP-IAR corrections from system 2 computed on the basis of GNSS signals are applied, which remove the hardware delays in the ambiguity term of the mobile. In both modes, the ambiguity terms are supposed to have integer nature.

The mobile or rover 30 is configured with software for real-time processing of its receiver data with precise orbit, clock and PPP IAR based corrections A, or corrections/observations from other reference stations. A mobile station 30 comprises a GNSS (e.g. GPS) receiver 32, an (optional) user interface unit 40, as well as a dedicated processing unit 38 for applying and implementing the method embodiments as described below. The processing unit 40 is arranged to receive the pseudo range mobile observations Pr and carrier phase mobile observations Φr from the GNSS receiver 32. The dedicated processing unit 38 co-operates with a separate receiving antenna 34 for receiving correction data as transmitted by the GNS signal correction system 2 or for receiving observation data from reference stations.

According to the present invention embodiments, integer carrier ambiguities in a GNSS precise positioning method are estimated. The method comprises iteratively solving a functional model for an observation vector obtained from a receiver r, the observation vector comprising observed minus computed code observations $\delta p_{i,r}^s$ and observed minus computed phase observations $\delta \phi_{i,r}^s$ of the receiver r to a plurality of GNSS satellites s for two or more carrier frequencies i, wherein integer carrier ambiguity terms of the functional model are estimated, e.g. satellite pair by satellite pair.

In known methods for estimating integer carrier ambiguities, these have to be estimated all at once, i.e. for each and every carrier phase observation from a receiver to each satellite being tracked. This puts a high demand on processing resources, and may result in long convergence times. Using the present invention embodiments, an acceptable estimation may be obtained quicker using the same hardware resources, or less capable hardware resources may be implemented to obtain a similar result.

The present invention embodiments are based on the realization that, especially during convergence, the estimated ambiguities are biased. Under certain conditions, this bias can be separated from the actual ambiguities by forming the extra wide-lane and wide-lane linear combinations. Next, the original real-valued ambiguities (e.g., for GPS: L1, L2 and L5), are corrected for this bias, resulting in reliable integer ambiguity estimation in the next processing step. Once the ambiguities are known, positioning precision improves, often dramatically.

In the description below the theory is derived for dual-frequency (e.g., GPS L1 and L2) data. However, the method can be applied to any number of carrier frequencies greater than one, and for other global navigation systems.

The functional model (or measurement equation) for a mobile in PPP mode with orbit, clock and UPDs being corrected beforehand and linearized (equivalent to the case of a mobile in a baseline mode with the observations of the reference station being differentiated beforehand) can be written as follows:

$$\delta p_{i,r}^s = \mu_r^s \Delta x + m_r^s \cdot T_r + t_{p_i,r} + \gamma_i I_r^{s,n} + e_{i,r}^s \quad (1)$$

$$\delta \phi_{i,r}^s = \mu_r^s \Delta x + m_r^s \cdot T_r + t_{\phi_i,r} - \gamma_i I_r^{s,n} + \lambda_i N_{i,r}^{s,n} + \varepsilon_{i,r}^s \quad (2)$$

where, i is the index for the carrier frequency (in case of a three carrier frequency GPS implementation i=1, 2, 5 for the L1, L2 and L5 carrier frequency, respectively);

$\delta p_{i,r}^s = p_{i,r}^s - R_r^s$ are the observed minus computed (OmC) code observations between receiver r and satellite s, s=1, 2, . . . , n−1, $\delta \phi_{i,r}^s = \phi_{i,r}^s - R_r^s$ are the OmC phase observations;

$\mu_r^s$ is the unit vector of line-of-sight between receiver r and satellite s, $\Delta x$ the corrections to the a priori position of the receiver;

$m_r^s$ is a tropospheric mapping function, $T_r$ is the tropospheric zenith delay;

$t_{p_i,r}$ and $t_{\phi_i,r}$ are receiver clock terms on code and phase, respectively;

$$\gamma_i = \frac{\lambda_i^2}{\lambda_1^2},$$

$\lambda_i$, the wavelength of carrier phase with i being the index for the carrier frequency (L1, L2, L5);

$I_r^{s,n}$ is the slant ionospheric delay between receiver r and satellite s;

$N_{i,r}^{s,n}$ are the carrier ambiguities to be fixed to their integer values, satellite n is assumed as the reference satellite;

$e_{i,r}^s$ and $\varepsilon_{i,r}^s$ are noise of code and phase observations.

As the corrections of orbit, clock and UPDs are applied in the mobile for the PPP mode (or the observations of the reference station are used to difference the corresponding observations in the baseline mode), the orbit and clock parameters are not presented in the functional model. In addition, the ambiguities have an integer nature. In the baseline mode, both troposphere and ionosphere are differenced between the mobile and the reference receivers, but the remaining troposphere and ionosphere are included in the model.

From the measurement equations, it is seen that the troposphere term and position terms are the same for all satellites and all types of observations. The receiver clock terms are observation type-dependent, but the same for all satellites. The ionospheric parameter is satellite-dependent, and ambiguity terms are satellite- and frequency-dependent. In general, the last two types of parameters are strongly correlated. During the initial convergence period of a satellite, the ionospheric parameter is more or less determined by code observations. Due to the fact that the noise of code observations is about 100 times larger than that of phase of observations, The ionospheric parameter cannot be well determined initially (i.e. during the convergence period). The code noise, multipath and orbit errors are generally lumped with the ionospheric term by the least-squares (or similar) estimation process; therefore, we could assume the estimate of the ionosphere to be $$\hat{I} = I + \Delta I \quad (3)$$

The subscript and superscript are ignored here for brevity. I is the expectation of actual ionosphere parameter vector containing all $I_r^{s,n}$, $\Delta I$ is the lumped bias vector, comprising code observation noise, multipath and orbit errors, which is not really observed ionosphere.

As we do not impose a constraint on the term, instead, an ionosphere float model is used. If there are no stable errors (like multipath and orbit errors), the expectation of $\Delta I$ should be zero, and it will vanish after a sufficiently long convergence time. But it may not always the case in reality and the lumped bias often last for rather long time (i.e., 30-60 minutes or even longer time). As the phase observations have much higher weight than code observations, $\Delta I$ cannot be squeezed into the phase residuals, but instead, lumped with the ambiguity term, during the convergence period. The following explanation starts with the case of L1 and L2, $$a_1 = N_1 - \frac{\gamma_1 \Delta I}{\lambda_1} \tag{4}$$

$$a_2 = N_2 - \frac{\gamma_2 \Delta I}{\lambda_2} \tag{5}$$

wherein $a_i, i=1, 2$ are the vectors of float ambiguities obtained from the least-squares estimation, $N_i, i=1, 2$ are the vectors of expect (or actual) integer ambiguities. The variance-covariance matrices of $a_1$ and $a_2$ are obtained from the least-squares:

$$\begin{bmatrix} Q_{a_1 a_1} & Q_{a_1 a_2} \\ Q_{a_2 a_1} & Q_{a_2 a_2} \end{bmatrix} \tag{6}$$

The traditional way known for fixing the ambiguities starts here with various de-correlation and search methods to solve the integers of $a_i, i=1, 2$ simultaneously without considering the biases term. In this case, the L1 or L2 ambiguity is often fixed wrongly during the convergence period, or it is difficult to pass the ratio test of the validation criterion.

The present invention embodiments start to fix the wide-lane ambiguity in the first step. The wide-lane (WL) ambiguity can be written as:

$$a_{wl} = N_1 - \frac{\gamma_1 \Delta I}{\lambda_1} - N_2 + \frac{\gamma_2 \Delta I}{\lambda_2} = (N_1 - N_2) - \left(\frac{\gamma_1 \Delta I}{\lambda_1} - \frac{\gamma_2 \Delta I}{\lambda_2}\right) \tag{7}$$

The variance-covariance of WL ambiguity is therefore obtained via the error propagation law:

$$Q_{a_{wl}} = Q_{a_1 a_1} + Q_{a_2 a_2} - Q_{a_1 a_2} - Q_{a_2 a_1} \tag{8}$$

It is easier to correctly fix correct integers of WL ambiguities than L1 and L2 ones individually. There are two reasons. The WL ambiguity has a much longer wavelength (0.862 m) than both L1 and L2 ambiguities (0.1905 m and 0.2445 m). The variance-covariance of WL ambiguity is highly de-correlated, which makes the ambiguity search much more sufficient. After fixing the WL ambiguity to its integer $ă_{wl} = Ň_1 - Ň_2$, we can get the corrections by subtracting the fixed integer ambiguity from the float one. This is the key point to separate the bias from the ambiguity term. In this case, we have $$a_{wl} - ă_{wl} = -\frac{\gamma_1 \Delta I}{\lambda_1} + \frac{\gamma_2 \Delta I}{\lambda_2} \tag{9}$$

Therefore, the lumped bias can be derived as follows:

$$\Delta I = -\frac{\lambda_1 \lambda_2}{\gamma_1 \lambda_2 - \gamma_2 \lambda_1} (a_{wl} - ă_{wl}) \tag{10}$$

Substituting eq. (10) into eq. (4), we obtain:

$$a_1 = N_1 + \frac{\gamma_1}{\lambda_1} \cdot \frac{\lambda_1 \lambda_2}{\gamma_1 \lambda_2 - \gamma_2 \lambda_1} (a_{wl} - ă_{wl}) = N_1 + \frac{\lambda_1}{\lambda_1 - \lambda_2} (a_{wl} - ă_{wl}) \tag{11}$$

The L1 ambiguity can be fixed on the basis of the following term:

$$Ň_1 = a_1 - \frac{\lambda_1}{\lambda_1 - \lambda_2} (a_{wl} - ă_{wl}) \tag{12}$$

instead of $a_1$, which could be biased, due to the fact that the estimation method may not be able to separate ambiguities and biases during the converge period. In this way, the L1 ambiguities can be fixed faster and more reliably on the basis of $Ň_1$. The L2 integer ambiguity can be therefore computed using $Ň_2 = Ň_1 - ă_{wl}$.

Alternatively, it is also possible to first fix L2 ambiguities after the WL ambiguities are fixed to their integers. Substituting eq. (10) into eq. (5), we obtain:

$$a_2 = N_2 + \frac{\gamma_2}{\lambda_2} \cdot \frac{\lambda_1 \lambda_2}{\gamma_1 \lambda_2 - \gamma_2 \lambda_1} (a_{wl} - ă_{wl}) = N_2 + \frac{\lambda_2}{\lambda_1 - \lambda_2} (a_{wl} - ă_{wl}) \tag{13}$$

The L2 ambiguities can be fixed on the basis of the following term:

$$Ň_2 = a_2 - \frac{\lambda_2}{\lambda_1 - \lambda_2} (a_{wl} - ă_{wl}) \tag{14}$$

instead of $a_2$, which could be biased, due to the fact that the estimation method may not be able to separate ambiguities and biases during the converge period. In this way, the L2 ambiguities can be fixed faster and more reliably on the basis of $Ň_2$. The L1 integer ambiguities can be therefore computed using $Ň_1 = Ň_2 + ă_{wl}$.

The method may be extended to the third frequency. Assume that the WL float ambiguities $a'_{wl}$ and their corresponding integers $ă'_{wl}$ are calculated from L1 and L5 ambiguities, therefore, the differences are obtained as follows:

$$a'_{wl} - ă'_{wl} = -\frac{\gamma_1 \Delta I}{\lambda_1} + \frac{\gamma_5 \Delta I}{\lambda_5} \tag{15}$$

The lumped bias can be derived as follows:

$$\Delta I = -\frac{\lambda_1 \lambda_5}{\gamma_1 \lambda_5 - \gamma_5 \lambda_1} (a'_{wl} - ă'_{wl}) \tag{16}$$

Substituting eq. (16) into eq. (4), we obtain:

$$a_1 = N_1 + \frac{\lambda_1}{\lambda_1 - \lambda_5}(a'_{wl} - \check{a}'_{wl}) \quad (17)$$

The L1 ambiguities can be fixed on the basis of the following term:

$$N_1 = a_1 - \frac{\lambda_1}{\lambda_1 - \lambda_5}(a'_{wl} - \check{a}'_{wl}) \quad (18)$$

This provides an opportunity to do cross-validation of fixed integer ambiguity with that produced with eq. (10). Or, in a further embodiment of the present invention, the method further comprises executing a cross validation of L1 fixed integer ambiguities $\check{N}_1$.

The steps of the present invention embodiments to exploit a correlation between the ionosphere delay I and the integer ambiguity terms N are as follows:
  determining float wide-lane ambiguities $a_{wl}$ using float ambiguities $a_i$, i=1, 2 from a least-squares estimation;
  fixing integer wide-lane ambiguities $\check{a}_{wl}$ on the basis of $a_{wl}$ and $Q_{a_{wl}}$;
  determining biased-free float ambiguities $N_1$ using $$N_1 = a_1 - \frac{\lambda_1}{\lambda_1 - \lambda_2}(a_{wl} - \check{a}_{wl}), \quad \text{(Eq. 12))}$$

or float ambiguities $N_2$ using $$N_2 = a_2 - \frac{\lambda_2}{\lambda_1 - \lambda_2}(a_{wl} - \check{a}_{wl}); \quad \text{(Eq. 14))}$$

fixing integer L1 ambiguities $\check{N}_1$, or L2 integer ambiguities $\check{N}_2$;
  computing integer L2 ambiguities $\check{N}_2 = \check{N}_1 - \check{a}_{wl}$, or L1 ambiguities $\check{N}_1 = \check{N}_2 + \check{a}_{wl}$.

As explained above, the present invention embodiments may be extended to a third carrier frequency (e.g. L5 band in GPS). In the embodiment, the correlation between the ionosphere delay I and the integer ambiguity terms N is exploited by
  determining float wide-lane ambiguities $a'_{wl}$ using float ambiguities $a_i$, i=1,5, i.e. L1 and L5 float ambiguities from a least-squares estimation;
  fixing integer wide-lane ambiguities $\check{a}'_{wl}$ on the basis of $a'_{wl}$ and $Q_{a'_{wl}}$;
  determining biased-free float ambiguities $N_1$ using $$N_1 = a_1 - \frac{\lambda_1}{\lambda_1 - \lambda_5}(a'_{wl} - \check{a}'_{wl});$$

fixing integer L1 ambiguities $\check{N}_1$;
  computing integer L5 ambiguities $\check{N}_5 = \check{N}_1 - \check{a}'_{wl}$.

In case of a mobile station 30, the mobile processing unit 38 is further arranged for providing observed minus computed code observations $\delta p_{i,r}^s$ and observed minus computed phase observations $\delta\phi_{i,r}^s$ of the receiver r to a plurality of s GNSS satellites for one or more carrier frequencies i based on the GNSS data and either orbit, clock and UPDs provided from the system 2 or full GNSS observations from system 2, and to execute the method embodiments as described above.

What is claimed is:

1. A method for precise positioning with improved integer ambiguity estimation in a Global Navigation Satellite System (GNSS), the method comprising:
  solving, by a mobile processing unit, a functional model between an observation vector obtained from a mobile GNSS receiver r, and a parameter vector, wherein the observation vector comprises observed minus computed code observations $\delta p_{i,r}^s$ and observed minus computed phase observations $\delta\phi_{i,r}^s$ of the GNSS receiver r to a plurality of GNSS satellites s for carrier frequencies $f_i$, wherein the parameter vector comprises a mobile position vector, carrier ambiguities N, and ionospheric delays I, and wherein the observation vector is formed from a linear transformation of the parameter vector;
  exploiting, by the mobile processing unit, a correlation between the ionospheric delays I and the carrier ambiguities N by:
    determining float ambiguities $a_i$, i=1, 2 for the carrier frequencies $f_i$, each float ambiguity comprising a carrier ambiguity and a lumped bias term;
    determining float wide-lane ambiguities $a_{wl} \equiv a_1 - a_2$;
    fixing integer wide-lane ambiguities $\check{a}_{wl}$ based on the float wide-lane ambiguities;
    using the integer wide-lane ambiguities $\check{a}_{wl}$ to determine float biased-free carrier ambiguities $N_j$ for at least one of the carrier frequencies $f_i$; and
    using the float biased-free carrier ambiguities $N_j$ to fix integer carrier ambiguities $\check{N}_j$ for the at least one of the carrier frequencies $f_i$;
  determining additional integer carrier ambiguities $\check{N}_k = \check{N}_j - \check{a}_{wl}$ for additional carrier frequencies; and
  applying, by the mobile processing unit, the integer carrier ambiguities and the additional integer carrier ambiguities to the functional model to improve at least one of a precision and a convergence time for determining a position of the mobile GNSS receiver.

2. The method according to claim 1, wherein the functional model for a GNSS system using at least two carrier frequencies are described as:

$$\delta p_{i,r}^s = \mu_r^s \Delta x + m_r^s \cdot T_r + t_{p_i,r} + \gamma_i I_r^{s,n} + e_{i,r}^s$$

$$\delta\phi_{i,r}^s = \mu_r^s \Delta x + m_r^s \cdot T_r + t_{\phi_i,r} - \gamma_i I_r^{s,n} + \lambda_i N_{i,r}^{s,n} + \varepsilon_{i,r}^s$$

where i is an index for the carrier frequency,
$\delta p_{i,r}^s = p_{i,r}^s - R_r^s$ are observed minus computed code observations between receiver r and satellite s, s=1, 2, ..., n,
$\delta\phi_{i,r}^s = \phi_{i,r}^s - R_r^s$ are observed minus computed phase observations,
$\mu_r^s$ is a unit vector of line-of-sight between receiver r and satellite s,
$\Delta x$ are corrections to the priori position of the receiver,
$m_r^s$ is a tropospheric mapping function,
$T_r$ is a tropospheric zenith delay,
$t_{p_i,r}$ and $t_{\phi_i,r}$ are receiver clock terms on code and phase, respectively;

$$\gamma_i = \frac{\lambda_i^2}{\lambda_1^2},$$

$\lambda_i$, the wavelength of carrier phase with i being the index for the carrier frequency, $I_r^{s,n}$ is a slant single-difference ionospheric delay between receiver r and satellite s with respect to satellite n, $N_{i,r}^{s,n}$ are the carrier ambiguities to be fixed to their integer values, the satellite n is a reference satellite, and $e_{i,r}^s$ and $\varepsilon_{i,r}^s$ are noise of code and phase observations.

3. The method according to claim 1, wherein exploiting the correlation between the ionospheric delays I and the carrier ambiguities N further comprising:

determining the float ambiguities $a_i$, i=1, 2 for carrier frequencies $f_1$ and $f_2$ of the carrier frequencies $f_i$ from a least-squares estimation;

fixing the integer wide-lane ambiguities $\grave{a}_{wl}$ on the basis of the float wide-lane ambiguities $a_{wl}$ and a wide-line covariance matrix $Q_{a_{wl}}$;

determining float biased-free carrier ambiguities $N_1$ for the carrier frequency $f_1$ using $$N_1 = a_1 - \frac{\lambda_1}{\lambda_1 - \lambda_2}(a_{wl} - \grave{a}_{wl});$$

fixing integer L1-ambiguities $\grave{N}_1$ for the carrier frequency $f_1$, and computing integer L2-ambiguities $\grave{N}_2 = \grave{N}_1 - \grave{a}_{wl}$ for the carrier frequency $f_2$.

4. The method according to claim 1, wherein exploiting the correlation between the ionospheric delays I and the carrier ambiguities N further comprising:

determining the float ambiguities $a_i$, i=1, 2 for carrier frequencies $f_1$ and $f_2$ of the carrier frequencies $f_i$ from a least-squares estimation;

fixing the integer wide-lane ambiguities $\grave{a}_{wl}$ on the basis of the float wide-lane ambiguities $a_{wl}$ and a wide-lane covariance matrix $Q_{a_{wl}}$;

determining float biased-free ambiguities $N_2$ for the carrier frequency $f_2$ using $$N_2 = a_2 - \frac{\lambda_2}{\lambda_1 - \lambda_2}(a_{wl} - \grave{a}_{wl}),$$

fixing integer L2-ambiguities $\grave{N}_2$ for the carrier frequency $f_2$, and computing integer L1-ambiguities $\grave{N}_1 = \grave{N}_2 + \grave{a}_{wl}$ for the carrier frequency $f_1$.

5. The method according to claim 3, wherein exploiting the correlation between the ionosphere delay I and the integer ambiguity terms N further comprising:

determining float ambiguities $a_5$ for carrier frequency $f_5$ of the carrier frequencies $f_i$ from a least-squares estimation;

determining further float wide-lane ambiguities $a'_{wl}$;

fixing integer further wide-lane ambiguities $\grave{a}'_{wl}$ on the basis of $a'_{wl}$ and a further wide-line covariance matrix $Q_{a'_{wl}}$;

determining the biased-free float ambiguities $N_1$ using $$N_1 = a_1 - \frac{\lambda_1}{\lambda_1 - \lambda_5}(a'_{wl} - \grave{a}'_{wl});$$

fixing the integer the L1-ambiguities $\grave{N}_1$ for the carrier frequency $f_1$, and;

computing integer L5-ambiguities $\grave{N}_5 = \grave{N}_1 - \grave{a}'_{wl}$ for the carrier frequency $f_5$.

6. The method according to claim 5, further comprising executing a cross validation of the integer-fixed L1-ambiguities $\grave{N}_1$.

7. The method according to claim 1, being a precise point positioning, PPP, method, wherein the carrier ambiguities N are single-differenced carrier phase ambiguities.

8. The method according to claim 1, being a precise relative positioning, PRP, method, wherein the carrier ambiguities N are double-differenced carrier phase ambiguities.

9. A mobile station, comprising:

a mobile GNSS receiver configured to acquire GNSS data comprising pseudo range mobile observations $P_r$ and carrier phase mobile observations $\Phi_r$ from the plurality of GNSS satellites transmitted over multiple epochs, a mobile signal receiver configured to receive GNSS corrections A or observations from reference stations, a mobile processing unit connected to the mobile GNSS receiver and the mobile signal receiver, the mobile processing unit configured to:

provide observed minus computed code observations $\delta p_{i,r}^s$ and observed minus computed phase observations $\delta \phi_{i,r}^s$ of the receiver r to a plurality of s GNSS satellites for carrier frequencies i based on the GNSS data, and solve a functional model between an observation vector obtained from the mobile GNSS receiver, and a parameter vector, wherein the observation vector comprises the observed minus computed code observations $\delta p_{i,r}^s$ and the observed minus computed phase observations $\delta \phi_{i,r}^s$ of the mobile GNSS receiver to a plurality of GNSS satellites for at least one of the carrier frequencies i and wherein the parameter vector comprises a mobile position vector, carrier ambiguities N and ionospheric delays I.

10. The mobile station according to claim 9, wherein the functional model using at least two carrier frequencies are described as:

$$\delta p_{i,r}^s = \mu_r^s \Delta x + m_r^s \cdot T_r + t_{p_i,r} + \gamma_i I_r^{s,n} + e_{i,r}^s$$

$$\delta \phi_{i,r}^s = \mu_r^s \Delta x + m_r^s \cdot T_r + t_{\phi_i,r} - \gamma_i I_r^{s,n} + \lambda_i N_{i,r}^{s,n} + \varepsilon_{i,r}^s$$

where i is an index for the carrier frequency, $\delta p_{i,r}^s = p_{i,r}^s - R_r^s$ are observed minus computed code observations between receiver r and satellite s, s=1, 2, ..., n, $\delta \phi_{i,r}^s = \phi_{i,r}^s - R_r^s$ are observed minus computed phase observations, $\mu_r^s$ is a unit vector of line-of-sight between receiver r and satellite s, $\Delta x$ are corrections to the priori position of the receiver, $m_r^s$ is a tropospheric mapping function, $T_r$ is a tropospheric zenith delay, $t_{p_i,r}$ and $t_{\phi_i,r}$ are receiver clock terms on code and phase, respectively;

$$\gamma_i = \frac{\lambda_i^2}{\lambda_1^2},$$

$\lambda_i$, the wavelength of carrier phase with i being the index for the carrier frequency, $I_r^{s,n}$ is a slant single-difference ionospheric delay between receiver r and satellite s with respect to satellite n, $N_{i,r}^{s,n}$ are the carrier ambiguities to be fixed to their integer values, the satellite n is a reference satellite, and $e_{i,r}^{s}$ and $\varepsilon_{i,r}^{s}$ are noise of code and phase observations.

11. The mobile station according to claim 9, wherein the mobile processing unit is further configured to:
exploit a correlation between the ionospheric delays I and the carrier ambiguities N by:
determine the float ambiguities $a_i$, i=1, 2 for carrier frequencies $f_1$ and $f_2$ of the carrier frequencies $f_i$ from a least-squares estimation;
fix the integer wide-lane ambiguities $\grave{a}_{wl}$ on the basis of the float wide-lane ambiguities $a_{wl}$ and a wide-line covariance matrix $Q_{a_{wl}}$;
determine float biased-free carrier ambiguities $N_1$ for the carrier frequency $f_1$ using $$N_1 = a_1 - \frac{\lambda_1}{\lambda_1 - \lambda_2}(a_{wl} - \grave{a}_{wl});$$

fix integer L1-ambiguities $\grave{N}_1$ for the carrier frequency $f_1$, and
compute integer L2-ambiguities $\grave{N}_2 = \grave{N}_1 - \grave{a}_{wl}$ for the carrier frequency $f_2$.

12. The mobile station according to claim 11, wherein the mobile processing unit is further configured to:
determine float ambiguities $a_5$ for carrier frequency $f_5$ of the carrier frequencies $f_i$ from a least-squares estimation;
determine further float wide-lane ambiguities $a'_{wl}$;
fix integer further wide-lane ambiguities $\grave{a}'_{wl}$ on the basis of $a'_{wl}$ and a further wide-line covariance matrix $Q_{a'_{wl}}$;
determine the biased-free float ambiguities $N_1$ using $$N_1 = a_1 - \frac{\lambda_1}{\lambda_1 - \lambda_5}(a'_{wl} - \grave{a}'_{wl});$$

fix the integer the L1-ambiguities $\grave{N}_1$ for the carrier frequency $f_1$, and;
compute integer L5-ambiguities $\grave{N}_5 = \grave{N}_1 - \grave{a}'_{wl}$ for the carrier frequency $f_5$.

13. The mobile station according to claim 9, wherein the mobile processing unit is further configured to:
exploit the correlation between the ionospheric delays I and the carrier ambiguities N by:
determine the float ambiguities $a_i$, i=1, 2 for carrier frequencies $f_1$ and $f_2$ of the carrier frequencies $f_i$ from a least-squares estimation;
fix the integer wide-lane ambiguities $\grave{a}_{wl}$ on the basis of the float wide-lane ambiguities $a_{wl}$ and a wide-lane covariance matrix $Q_{a_{wl}}$;
determine float biased-free ambiguities $N_2$ for the carrier frequency $f_2$ using $$N_2 = a_2 - \frac{\lambda_2}{\lambda_1 - \lambda_2}(a_{wl} - \grave{a}_{wl}),$$

fix integer L2-ambiguities $\grave{N}_2$ for the carrier frequency $f_2$, and
compute integer L1-ambiguities $\grave{N}_1 = \grave{N}_2 + \grave{a}_{wl}$ for the carrier frequency $f_1$.

14. The mobile station according to claim 13, wherein the mobile processing unit is further configured to execute a cross validation of the integer-fixed L1-ambiguities $\grave{N}_1$.

15. The mobile station according to claim 9, being a precise point positioning, PPP, method, wherein the carrier ambiguities N are single-differenced carrier phase ambiguities.

16. The mobile station according to claim 9, being a precise relative positioning, PRP, method, wherein the carrier ambiguities N are double-differenced carrier phase ambiguities.

17. A non-transitory computer-readable medium storing instructions, which when executed by a processor of a mobile station, causes the processor of the mobile station to:
acquire, via a mobile GNSS receiver, GNSS data comprising pseudo range mobile observations $P_r$ and carrier phase mobile observations $\Phi_r$, from the plurality of GNSS satellites transmitted over multiple epochs;
receive, via a mobile signal receiver, GNSS corrections A or observations from reference stations;
provide observed minus computed code observations $\delta p_{i,r}^{s}$ and observed minus computed phase observations $\delta \phi_{i,r}^{s}$ of the receiver r to a plurality of s GNSS satellites for carrier frequencies i based on the GNSS data; and
solve a functional model between an observation vector obtained from the mobile GNSS receiver, and a parameter vector, wherein the observation vector comprises the observed minus computed code observations $\delta p_{i,r}^{s}$ and the observed minus computed phase observations $\delta \phi_{i,r}^{s}$ of the mobile GNSS receiver to a plurality of GNSS satellites for at least one of the carrier frequencies i and wherein the parameter vector comprises a mobile position vector, carrier ambiguities N and ionospheric delays I.

18. The non-transitory computer readable medium according to claim 17, wherein the functional model using at least two carrier frequencies are described as:

$$\delta p_{i,r}^{s} = \mu_r^{s} \Delta x + m_r^{s} \cdot T_r + t_{p_i,r} + \gamma_i I_r^{s,n} + e_{i,r}^{s}$$

$$\delta \phi_{i,r}^{s} = \mu_r^{s} \Delta x + m_r^{s} \cdot T_r + t_{\phi_i,r} - \gamma_i I_r^{s,n} + \lambda_i N_{i,r}^{s,n} + \varepsilon_{i,r}^{s}$$

where i is an index for the carrier frequency,
$\delta p_{i,r}^{s} = p_{i,r}^{s} - R_r^{s}$ are observed minus computed code observations between receiver r and satellite s, s=1, 2, . . . , n,
$\delta \phi_{i,r}^{s} = \phi_{i,r}^{s} - R_r^{s}$ are observed minus computed phase observations,
$\mu_r^{s}$ is a unit vector of line-of-sight between receiver r and satellite s,
$\Delta x$ are corrections to the priori position of the receiver,
$m_r^{s}$ is a tropospheric mapping function,
$T_r$ is a tropospheric zenith delay,
$t_{p_i,r}$ and $t_{\phi_i,r}$ are receiver clock terms on code and phase, respectively;

$$\gamma_i = \frac{\lambda_i^2}{\lambda_1^2},$$

$\lambda_i$, the wavelength of carrier phase with i being the index for the carrier frequency,
$I_r^{s,n}$ is a slant single-difference ionospheric delay between receiver r and satellite s with respect to satellite n,
$N_{i,r}^{s,n}$ are the carrier ambiguities to be fixed to their integer values, the satellite n is a reference satellite, and $e_{i,r}^{s}$ and $\varepsilon_{i,r}^{s}$ are noise of code and phase observations.

19. The non-transitory computer readable medium according to claim 17, further comprising instructions, which when executed by the processor of the mobile station, causes the processor to:

exploit a correlation between the ionospheric delays I and the carrier ambiguities N by:

determine the float ambiguities $a_i, i=1, 2$ for carrier frequencies $f_1$ and $f_2$ of the carrier frequencies $f_i$ from a least-squares estimation;

fix the integer wide-lane ambiguities $\grave{a}_{wl}$ on the basis of the float wide-lane ambiguities $a_{wl}$ and a wide-line covariance matrix $Q_{a_{wl}}$;

determine float biased-free carrier ambiguities $N_1$ for the carrier frequency $f_1$ using $$N_1 = a_1 - \frac{\lambda_1}{\lambda_1 - \lambda_2}(a_{wl} - \grave{a}_{wl});$$

fix integer L1-ambiguities $\grave{N}_1$ for the carrier frequency $f_1$, and compute integer L2-ambiguities $\grave{N}_2 = \grave{N}_1 - \grave{a}_{wl}$ for the carrier frequency $f_2$.

20. The non-transitory computer readable medium according to claim 19, further comprising instructions, which when executed by the processor of the mobile station, causes the processor to:

determine float ambiguities $a_5$ for carrier frequency $f_5$ of the carrier frequencies $f_i$ from a least-squares estimation;

determine further float wide-lane ambiguities $a'_{wl}$;

fix integer further wide-lane ambiguities $\grave{a}'_{wl}$ on the basis of $a'_{wl}$ and a further wide-line covariance matrix $Q_{a'_{wl}}$;

determine the biased-free float ambiguities $N_1$ using $$N_1 = a_1 - \frac{\lambda_1}{\lambda_1 - \lambda_5}(a'_{wl} - \grave{a}'_{wl});$$

fix the integer the L1-ambiguities $\grave{N}_1$ for the carrier frequency $f_1$, and;

compute integer L5-ambiguities $\grave{N}_5 = \grave{N}_1 - \grave{a}'_{wl}$ for the carrier frequency $f_5$.

* * * * *